July 27, 1954  S. A. BERGEN  2,685,064
ELECTRICAL MEASURING AND INDICATING SYSTEM
Filed July 13, 1951  2 Sheets-Sheet 1

Inventor
Stephen A. Bergen
By Ralph B. Stewart
Attorney

July 27, 1954     S. A. BERGEN     2,685,064
ELECTRICAL MEASURING AND INDICATING SYSTEM
Filed July 13, 1951     2 Sheets-Sheet 2

Inventor
Stephen A. Bergen
By Ralph B. Stewart
Attorney

Patented July 27, 1954

2,685,064

UNITED STATES PATENT OFFICE 2,685,064

ELECTRICAL MEASURING AND INDICATING SYSTEM

Stephen Archbold Bergen, London, England, assignor to Evershed & Vignoles Limited, London, England, a British company Application July 13, 1951, Serial No. 236,667

Claims priority, application Great Britain July 19, 1950

10 Claims. (Cl. 324—99)

This invention relates to electrical indicating or repeating systems in which the magnitude of a physical quantity, represented by an electric current, produced, for example, by a measuring instrument, is repeated by one or more locally or remotely situated indicating instruments. The invention is particularly concerned with such a system in which the current is insufficient in itself to control directly the indications of the repeaters. A typical example of such a system is one for the measurement of temperature by means of a thermocouple, in which the output current is at the most, only a few microamperes.

According to the present invention, the current representing the physical quantity to be indicated is caused to flow in a coil mounted to turn in a magnetic field and arranged so that the torque produced is opposed by the effect of a current flowing in a second coil having a substantially smaller number of turns. The angular position of the coils is used to vary the differential illumination of a pair of photo-electric cells connected in series across a source of polarising potential to form a bridge circuit and the out-of-balance voltage of this bridge circuit then serves to control the current in the second coil in such a way as to establish a balance between the torques produced by the two coils. The current in the second coil required to establish the balance will depend on the current in the first coil, and thus may be used as a measure of the physical quantity. By reason, however, of the ratio of the numbers of turns in the two coils, the current in the second coil will be considerably greater than the original current and may be used to operate a number of repeaters which may then be calibrated accordingly.

In order to give a compact construction of instrument, the two coils are preferably wound on a common former mounted to turn in a permanent magnet field after the manner of the moving coil of an electrical measuring instrument. The movements of the coil assembly then serve to vary the position of a shutter controlling the differential illumination of the two photoelectric cells. Any small displacement of the coils provides a corresponding displacement of the shutter and allows more light from a source of illumination to fall on one cell than the other and thus upsets the balance of the bridge circuit to produce the desired effect.

Most conveniently the out-of-balance voltage of the bridge is used to control the grid potential of a thermionic valve whose anode circuit includes the second coil and the desired number of electrical measuring instruments functioning as repeaters. As the deflection of the shutter becomes greater due to increasing current in the first coil so the balance of the bridge circuit is varied to provide a corresponding increase in the anode current of the valve, thus increasing the torque provided by the second coil until the balance between the two coils is again established.

Such an instrument is rather susceptible to small changes in the ambient temperature which causes corresponding changes in the resistance of the two coils. The first coil consists of a relatively large number of turns of wire and any increase in its resistance due to rise of temperature will lead to a decrease in the current flowing through it, with a corresponding decrease in the current flowing in the second coil and hence in the repeater circuit. The usual method of providing this correction in a moving coil instrument is to connect a large swamping resistance having a zero temperature co-efficient in series with the coil of the instrument. This increases the overall resistance of the circuit so that any variations in the coil resistance represent only a negligible percentage of the total. This method is, however, quite impracticable in the present instance owing to the small voltages available for producing current in the first coil and in conjunction with which the instrument is desired to operate.

This error is overcome in accordance with the invention by the provision of a resistance of a material having a high temperature co-efficient of resistance, such as nickel, connected in series with the second coil and a resistance of a material having a negligible co-efficient of resistance, such as manganin, connected in parallel both with the second coil and with the series resistance. The effect of a rise of temperature under these conditions is that the current in the first coil drops and the system operates to bring about a corresponding drop in current in the second coil. Despite this reduction in the current in the second coil, the increase of the value of the series resistance is sufficient to bring about an increase in the voltage across the coil and the series resistance considered together, and hence also across the shunt. This leads to a corresponding increase in the current flowing through the shunt and thus a net increase in the total current flowing in the repeater circuit. By suitable choice of the values of the respective resistances, this increase in current can be made to compensate for the decrease produced by the rise of temperature of the two coils. It can be shown that the relationship between the series and shunting resistances and the increase of current is linear so that by a suitable choice of these resistances, effective temperature correction over a wide range can be obtained.

Although the instrument will operate under the control of the torque produced by the two coils, in the absence of any currents flowing in the coils there is nothing to determine the position of the coil assembly, and it is, therefore, desirable to provide a light control spring for centralising the coil assembly under these conditions. When the instrument is used in conjunction with a thermocouple for measuring the temperature of the hot junction, errors will be introduced by any variation of the temperature of the cold junction in accordance with the ambient temperature.

In order to overcome this, the metals forming the thermocouple may be continued in the form of electrical leads as far as the points of connection to the first coil so that these points constitute the cold junction of the thermocouple. Thus the temperature in the immediate vicinity of the instrument itself governs the temperature of the cold junction. If this temperature rises slightly, the output of the thermocouple will drop by a corresponding amount and the torque produced by the first coil will also drop. This error is corrected by the provision of a bi-metallic strip connected to one end of the control spring and arranged to bend under the effect of a rise of temperature, in such a direction as to assist the torque produced by the first coil. Thus when the temperature rises there will be a slight drop in the torque produced by the first coil due to the drop in the output of the thermocouple, but this will be compensated for by the slight increase in the effect of the control spring produced by the bending of the bi-metallic strip. Under these conditions, the instrument may be calibrated directly in terms of the temperature of the hot junction without the need for application of any further corrections for cold junction temperature.

A system in accordance with the invention for providing indications of temperature will now be described in more detail by way of example with reference to the accompanying drawings, in which.

Figure 1:
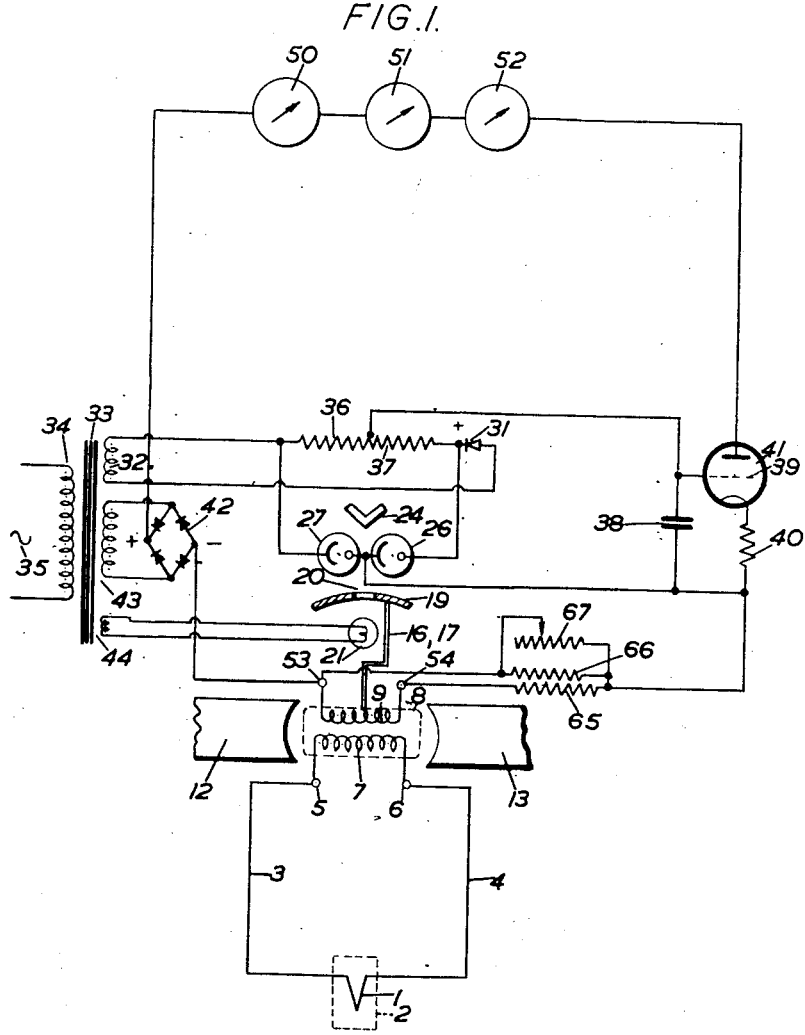
Figure 1 is a circuit diagram.
Figure 2:
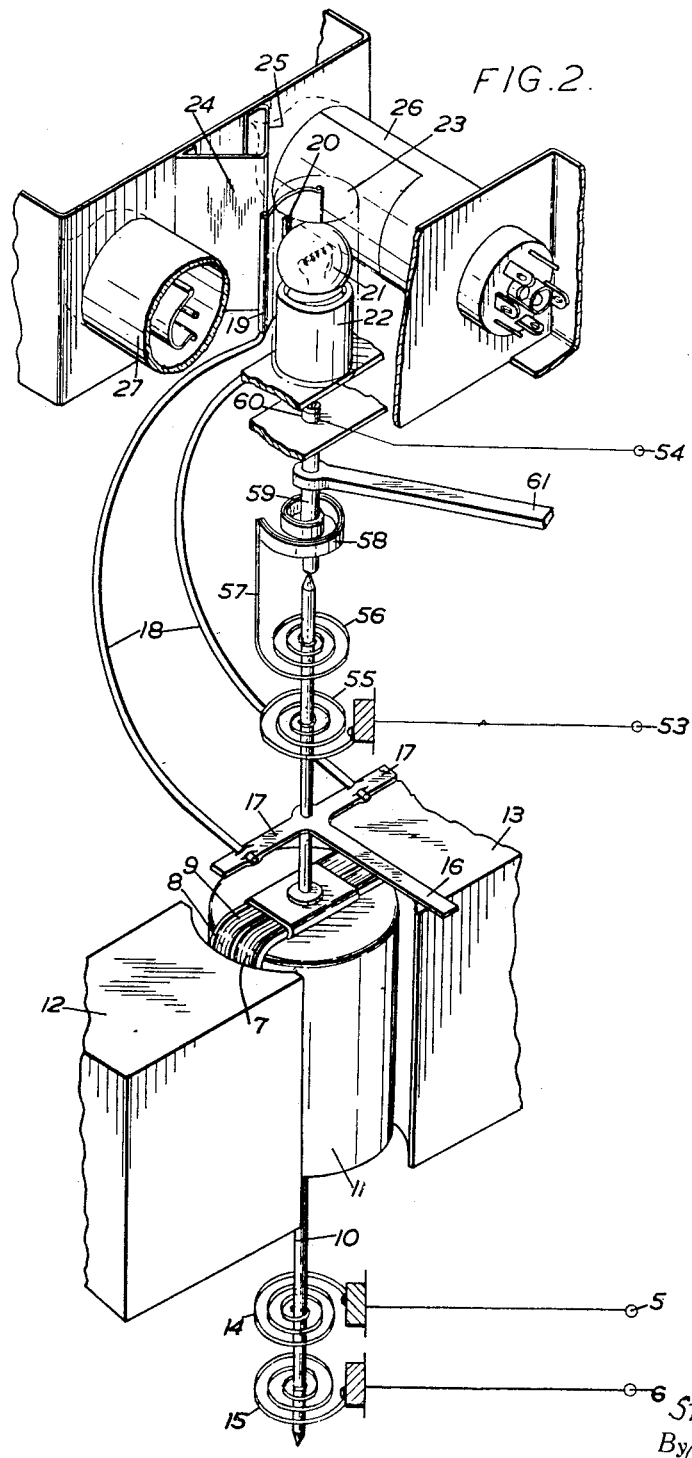
Figure 2 is a diagrammatic perspective view of the arrangement of part of the apparatus.

Turning first to Figure 1, the hot junction 1 of a thermocouple is enclosed in a refractory sheath indicated generally at 2, for insertion in a furnace or other point of variable temperature. The metals constituting the thermocouple are continued from the hot junction at 1 in the form of electric leads 3 and 4 to terminals 5 and 6 where they are connected to a coil 7 shown in more detail in Figure 2. The coil 7 is wound on one side of a former 8, on the other side of which is wound a second coil 9 having a considerably smaller number of turns than the coil 7. The former 8 is mounted on a spindle 10, which is shown in Figure 2 of an exaggerated length for purposes of illustration.

The coils are mounted to turn around a copper core 11 in the gap between permanent magnets 12 and 13 in the manner of the moving coil of an electrical measuring instrument, and the connections from the terminals 5 and 6 are made by way of opposite spiral ligaments 14 and 15 which are so weak as to have no appreciable controlling effect on the coils. The spindle 10 carries a T-shaped member, the main limb 16 of which is arranged for supporting a pointer moving over a scale neither of which are shown in the drawings. The other limbs 17 of the T carry a pair of slender supports 18 for a moving shutter 19 formed with a central slit 20. The shutter 19 controls the light emitted from an electric lamp 21 mounted in a socket 22 and provided with a cylindrical cover 23 shown dotted in Figure 2, and formed with a broad slit on the side adjacent the shutter 19. When the shutter 19 is in the central position, light from the lamp 21 falls symmetrically on a polished metal reflector 24 formed with a sharp angle 25 to reflect light equally on to two photo-electric cells 26 and 27 (the photo-electric cell 27 being slightly broken away for purposes of illustration). The purpose of the cover 23 is to prevent illumination passing directly from the lamp 21 to the photo-electric cells 26 and 27 without passing through the slit 20 in the shutter 19. The photo-electric cells 26 and 27 are connected in series with one another across a source of direct voltage potential represented by a half-wave rectifier 31 supplied from a secondary winding 32 of a transformer 33, the primary winding 34 of which is supplied from a source of alternating current 35.

The photo-electric cells 26 and 27 form two arms of a bridge circuit, the other two arms of which are constituted by the two halves 36 and 37 of a resistance connected in parallel with the two cells 25 and 26 across the source of direct current potential. The mid-point between the two cells and the mid-point between the two halves of the resistance 36 and 37 are connected respectively to a small condenser 38 connected between the grid 39 and one end of a cathode resistance 40 of a thermionic valve 41. The valve 41 is supplied from a full-wave rectifier 42 connected to a further secondary winding 43 of the transformer 33, while a third secondary winding 44 supplies the lamp 21.

The anode circuit of the valve 41 includes the coil 9 and a number of repeaters 50, 51 and 52 situated at remote points where indications are required. The connections to the coil 9 are made by way of terminals 53 and 54 as seen most clearly in Figure 2. The connections are led from the terminals through oppositely wound spiral springs 55 and 56. These are somewhat more rigid than the ligaments 14 and 15 and have a controlling effect on the coil assembly, serving to move it into the central position in which the two photo-electric cells 26 and 27 are equally illuminated, when there is no current flowing in the coils 7 and 9.

The connection from the terminal 53 passes directly through the spring 55, the outer end of which is rigidly anchored, and then along a lead (not shown) down the spindle 10. The outer end of the spring 56, however, is connected by way of a rigid wire 57 to the outer end of a bi-metallic strip 58 wound into an open spiral. The inner end of the spiral is connected to a rod 59 mounted at 60 in the casing of the instrument. Thus the connection from the terminal 54 passes by way of the rod 59, the bi-metallic strip 58, the wire 57 and the spring 56 to a lead (not shown) down the spindle 10 and thence to the coil 9. The rod 59 is rigidly mounted at 60 but is provided with an arm 61 by means of which it can be turned slightly in its mounting. This also turns the bi-metallic strip 58 and thereby regulates the twist in the spring 56 so as to provide a zero setting for the coil assembly under conditions of zero current flow.

Also connected in series with the coil 9 in the anode circuit of the valve 41 is a nickel resistance 65, and in addition a manganin resistance 66 is connected in parallel both with the resistance 55 and with the coil 9. The value of this manganin resistance 66 can be varied by means of a shunt 67, also of manganin.

Under any particular conditions of temperature of the hot junction 1 of the thermocouple, a current will flow in the coil 7, producing a torque in an anti-clockwise direction. This will cause the coil assembly to move the shutter 19 to the left, thus increasing the illumination of the photo-electric cell 27 and reducing the illumination of the photo-electric cell 26. Under conditions of balance, the grid bias provided by the resistance 40 prevents any current flowing through the valve 41, but as soon as the balance of the bridge circuit is disturbed by the unequal illumination of the two photo-electric cells, a current flows into the condenser 38 so as to raise the potential of the grid 39 and allow a current to flow in the anode circuit which is proportional to the degree of out-of-balance of the bridge. This current flows through the coil 9 and provides a counter torque which balances the torque produced by the coil 7. If, for example, the current in the coil 7 increases, then the degree of out-of-balance of the grid becomes greater, increasing the anode current of the valve 41 until once again a balance is achieved between the torques produced by the coils 7 and 9, with a corresponding increased value of the current in the coil 9.

To consider a particular example, the coils 7 and 9 may comprise respectively two hundred and six turns of aluminum wire, so that to achieve a balance between the two torques, the current in the coil 9 must be 33.3 times greater than that in the coil 7. Thus, although the current produced by the thermocouple is too small by itself to operate repeaters, the current in the coil 9, which will be at all times directly proportional to the output of the thermocouple, can operate as many repeaters as are needed.

Considering the same example, the resistance of the aluminum wire of the coil 9, which at normal temperatures will have a value of the order of 1,000 ohms will increase with temperature to introduce the error already described. To compensate for this, the nickel resistance 65 has a value of 60 ohms, while the manganin resistance 66 has a value of 15 ohms which can be varied by regulation of the shunt 67, which has a total value of 200 ohms. With these particular values of resistance, accurate temperature compensation can be obtained over the whole range of ambient temperatures which are likely to be encountered in practice.

Similarly, any increase in the temperature of the cold junction as represented by the terminals 5 and 6 will bring about a corresponding reduction in the current flowing in the coil 7 and consequently also in that flowing in the coil 9. The increase in the ambient temperature, however, will cause the bi-metallic strip 58 to unwind slightly, thus increasing the effect of the spring 56 and assisting the anti-clockwise torque produced by the coil 7. The balancing torque produced by the coil 9 will, therefore, automatically be adjusted to balance this increase, and this increased current will then compensate for the error introduced by the rise in temperature. Under these conditions, the repeaters may then be calibrated directly in terms of the temperature of the hot junction without having to apply any correction for the cold junction temperature.

By suitable choice of the ratio of the numbers of turns in the coils 7 and 9 any desired multiplication of the output of the thermocouple may be obtained, and according to the resistance of the coil 9, so the values of the resistances 65 and 66 will be chosen accordingly.

Although a particular example of the system has been described in connection with its use with a thermocouple, it will be obvious that the input to the coil 7 may be provided by any current representing a physical quantity to be indicated and repeated and which by itself is not sufficient to operate the repeaters.

I claim:

1. An electrical measuring and indicating system comprising in combination, a first coil mounted to turn in a magnetic field, means for supplying a unidirectional electric current to said coil, said current being proportional to a physical quantity to be measured, a second coil formed of a number of turns equal to only a small fraction of the turns of said first coil, said second coil also being mounted to turn in a magnetic field and being mechanically coupled to said first coil, means for supplying a unidirectional electric current to said second coil to produce a torque in opposition to the torque produced by the current in said first coil, a bridge circuit comprising a source of unidirectional potential and a pair of photo-electric cells connected in series with said source of potential, means responsive to the angular position of said first coil for controlling the differential illumination of said photo-electric cells, and means responsive to the degree of unbalance of said bridge circuit for controlling the current in said second coil.

2. An electrical measuring and indicating system comprising in combination, a former mounted to turn in a magnetic field, a first coil wound on said former, means for supplying a unidirectional current to said coil, said current being proportional to a physical quantity to be measured, a second coil also wound on said former, said second coil being formed of a number of turns equal to only a small fraction of the turns of said first coil, means for supplying a unidirectional current to said second coil in a direction to produce a torque on said former in opposition to that of the current in said first coil, a bridge circuit comprising a source of unidirectional potential and a pair of photo-electric cells connected in series with said source of potential, a source of illumination, means responsive to the angular position of said former for controlling the proportion of illumination from said source falling on each of said photo-electric cells, means responsive to the degree of unbalance of said bridge circuit for controlling the current in said second coil and means for measuring said current.

3. An electrical measuring and indicating system comprising in combination, a former mounted to turn in a magnetic field, a first coil wound on said former, means for supplying a unidirectional current to said coil, said current being proportional to a physical quantity to be measured, a second coil also wound on said former, said second coil being formed of a number of turns equal to only a small fraction of the turns of said first coil, means for supplying a unidirectional current to said second coil in a direction to produce a torque on said former in opposition to that of the current in said first coil, a bridge circuit comprising a source of unidirectional potential and a pair of photo-electric cells connected in series with said source of potential, a source of illumination, a shutter interposed between said source of illumination and said photo-electric cells, said shutter being mounted to turn with said former and being formed with an aperture to vary the relative illuminations on each of said photo-electric cells in accordance with the angular position of said former, means responsive to the degree of unbalance of said bridge circuit for controlling the current in said second coil, and means for measuring said current.

4. An electrical measuring and indicating system comprising in combination, a former mounted to turn in a magnetic field, a first coil wound on said former, means for supplying a unidirectional current to said coil, said current being proportional to a physical quantity to be measured, a second coil also wound on said former, said second coil being formed of a number of turns equal to only a small fraction of the turns of said first coil, a thermionic tube having a control grid, a source of direct current connected in the plate circuit of said tube in series with said second coil to supply current in a direction to produce a torque on said former in opposition to that of the current in said first coil, a condenser connected between the cathode and the control grid of said tube, a bridge circuit comprising a source of unidirectional potential and a pair of photo-electric cells connected in series with said source of potential, the opposite points of said bridge circuit being connected across said condenser, a source of illumination, means responsive to the angular position of said former for controlling the proportion of illumination from said source falling on each of said photo-electric cells and means for measuring the current in the plate circuit of said tube consequent on unbalance of said bridge circuit.

5. An electrical measuring and indicating system comprising in combination, a former mounted to turn in a magnetic field, a first coil wound on said former, means for supplying a unidirectional current to said coil, said current being proportional to a physical quantity to be measured, a second coil also wound on said former, said second coil being formed of a number of turns equal to only a small fraction of the turns of said first coil, means for supplying a unidirectional current to said second coil in a direction to produce a torque on said former in opposition to that of the current in said first coil, a first resistance having a high temperature coefficient of resistance connected in series with said second coil, a second resistance having a negligible temperature coefficient of resistance connected in parallel with said second coil and said first resistance, a bridge circuit comprising a source of unidirectional potential and a pair of photo-electric cells connected in series with said source of potential, a source of illumination, means responsive to the angular position of said former for controlling the proportion of illumination from said source falling on each of said photo-electric cells, means responsive to the degree of unbalance of said bridge circuit for controlling the current in said second coil and means for measuring said current.

6. An electrical measuring and indicating system comprising in combination, a former mounted to turn in a magnetic field, a first coil wound on said former, means for supplying a unidirectional current to said coil, said current being proportional to a physical quantity to be measured, a second coil also wound on said former, said second coil being formed of a number of turns equal to only a small fraction of the turns of said first coil, a thermionic tube having a control grid, a source of direct current connected in the plate circuit of said tube in series with said second coil to supply current in a direction to produce a torque on said former in opposition to that of the current in said first coil, a first resistance having a high temperature coefficient of resistance connected in series with said second coil, a second resistance having a negligible temperature coefficient of resistance connected in parallel with said second coil and said first resistance, a bridge circuit comprising a source of unidirectional potential and a pair of photo-electric cells connected in series with said source of potential, a condenser connected between the cathode and the control grid of said tube and between the opposite points of said bridge circuit, a source of illumination, a shutter interposed between said source of illumination and said photo-electric cells, said shutter being mounted to turn with said former and being formed with an aperture to vary the relative illumination on each of said photo-electric cells in accordance with the angular position of said former, and means for measuring the current in the plate circuit of said tube consequent on unbalance of said bridge circuit.

7. An electrical system for measuring and indicating temperature comprising in combination, a former mounted to turn in a magnetic field, a first coil wound on said former, a thermocouple connected to said first coil, a second coil also wound on said former, said second coil being formed of a number of turns equal to only a small fraction of the turns of said first coil, a thermionic tube having a control grid, a source of direct current connected in the plate circuit of said tube in series with said second coil to supply current in a direction to produce a torque on said former in opposition to that of the current from said thermocouple flowing in said first coil, a first resistance having a high temperature coefficient of resistance connected in series with said second coil, a second resistance having a negligible temperature coefficient of resistance connected in parallel with said second coil and said first resistance, a condenser connected between the cathode and the control grid of said tube, a bridge circuit comprising a source of unidirectional potential and a pair of photo-electric cells connected in series with said source of potential, the opposite points of said bridge circuit being connected across said condenser, a source of illumination, a shutter interposed between said source of illumination and said photo-electric cells, said shutter being mounted to turn with said former and being formed with an aperture to vary the relative illumination of each of said photo-electric cells in accordance with the angular position of said former and means for measuring the current in the plate circuit of said tube consequent on unbalance of said bridge circuit.

8. An electrical system for measuring and indicating temperature, comprising in combination, a first coil mounted to turn in a magnetic field, a thermocouple connected to said first coil, a second coil formed of a number of turns equal to only a small fraction of the turns of said first coil, said second coil also being mounted to turn in a magnetic field and being mechanically coupled to said first coil, a source of direct current connected in series with said second coil to supply current producing a torque in opposition to that produced by the current from said thermocouple flowing in said first coil, a first resistance having a high temperature coefficient of resistance connected in series with said second coil, a second resistance having a negligible temperature coefficient of resistance connected in parallel with said second coil and said first resistance, a bridge circuit comprising a source of unidirectional potential and a pair of photo-electric cells connected in series with said source of potential, a source of illumination, a shutter interposed between said source of illumination and said photo-electric cells, said shutter being mounted to turn with said first coil and being formed with an aperture to vary the relative illumination of each of said photo-electric cells in accordance with the angular position of said first coil, means responsive to the degree of unbalance of said bridge for regulating the current in said second coil and means for measuring said current.

9. An electrical system for measuring and indicating temperature, comprising in combination, a first coil mounted to turn in a magnetic field, a thermocouple connected to said first coil, the cold junction of said thermocouple lying in the vicinity of said first coil, a spring controlling the movement of said first coil, a bimetallic strip connected to one end of said spring, a second coil formed of a number of turns equal to only a small fraction of the turns of said first coil, said second coil also being mounted to turn in a magnetic field and being mechanically coupled to said first coil, a source of direct current connected in series with said second coil to supply current producing a torque in opposition to that produced by the current from said thermocouple flowing in said first coil, a bridge circuit comprising a source of unidirectional potential and a pair of photo-electric cells connected in series with said source of potential, the opposite points of said bridge circuit being connected across said condenser, a source of illumination, a shutter interposed between said source of illumination and said photo-electric cells, said shutter being mounted to turn with said first coil and being formed with an aperture to vary the relative illumination of each of said photo-electric cells in accordance with the angular position of said first coil, means responsive to the degree of unbalance of said bridge for regulating the current in said second coil, and means for measuring said current.

10. An electrical system for measuring and indicating temperature, comprising in combination, a former mounted to turn in a magnetic field, a first coil wound on said former, a thermocouple connected to said first coil, the cold junction of said thermocouple lying in the vicinity of said former, a spring controlling the movement of said former, a bimetallic strip connected to one end of said spring, a second coil also wound on said former, said second coil being formed of a number of turns equal to only a small fraction of the turns of said first coil, a thermionic tube having a control grid, a source of direct current connected in the plate circuit of said tube in series with said second coil to supply current in a direction to produce a torque on said former in opposition to that of the current from said thermocouple flowing in said first coil, a plurality of measuring instruments connected in series with said source of direct current, a resistance having a high temperature coefficient of resistance connected in series with said second coil, a second resistance having a negligible temperature coefficient of resistance connected in parallel with said second coil and said first resistance, a condenser connected between the cathode and the control grid of said tube, a bridge circuit comprising a source of unidirectional potential and a pair of photo-electric cells connected in series with said source of potential, the opposite points of said bridge circuit being connected across said condenser, a source of illumination and a shutter interposed between said source of illumination and said photo-electric cells, said shutter being mounted to turn with said former and being formed with an aperture to vary the relative illumination of each of said photo-electric cells in accordance with the angular position of said former.

References Cited in the file of this patent

UNITED STATES PATENTS

| Number | Name | Date |
| --- | --- | --- |
| Re. 20,476 | Wilson et al. | Apr. 17, 1937 |
| Re. 21,806 | Johnson | May 20, 1941 |
| 2,169,116 | Thompson | Aug. 8, 1939 |
| 2,391,271 | Rich | Dec. 18, 1945 |
| 2,400,308 | Klepp | May 14, 1946 |
| 2,434,544 | Boykin | Jan. 13, 1948 |
| 2,443,073 | Knudsen | June 8, 1948 |
| 2,505,420 | McCrary et al. | Apr. 25, 1950 |
| 2,567,276 | Dicke | Sept. 11, 1951 |
| 2,573,929 | Petzinger | Nov. 6, 1951 |